US012725409B2

(12) United States Patent
LoVetri et al.

(10) Patent No.: US 12,725,409 B2
(45) Date of Patent: Sep. 1, 2026

(54) DEEP LEARNING FOR ELECTROMAGNETIC IMAGING OF STORED COMMODITIES

(71) Applicant: University of Manitoba, Winnipeg (CA)

(72) Inventors: Joe LoVetri, Winnipeg (CA); Vahab Khoshdel, Winnipeg (CA); Mohammad Asefi, Winnipeg (CA); Ahmed Bilal Ashraf, Winnipeg (CA)

(73) Assignee: University of Manitoba, Winnipeg (CA)

( * ) Notice: Subject to any disclaimer, the term of this patent is extended or adjusted under 35 U.S.C. 154(b) by 223 days.

(21) Appl. No.: 18/551,688

(22) PCT Filed: Mar. 16, 2022

(86) PCT No.: PCT/IB2022/052391

§ 371 (c)(1),
(2) Date: Sep. 21, 2023

(87) PCT Pub. No.: WO2022/200931

PCT Pub. Date: Sep. 29, 2022

(65) Prior Publication Data

US 2024/0169716 A1 May 23, 2024

Related U.S. Application Data

(60) Provisional application No. 63/163,957, filed on Mar. 22, 2021.

(51) Int. Cl.

| | |
|---|---|
| ***G06V 10/00*** | (2022.01) |
| ***G06V 10/25*** | (2022.01) |
| ***G06V 10/82*** | (2022.01) |

(52) U.S. Cl.
CPC .............. *G06V 10/82* (2022.01); *G06V 10/25* (2022.01)

(58) Field of Classification Search
CPC ...... G06V 10/82; G06V 10/25; G06N 3/0455; G06N 3/0464; G06N 3/09; G06N 3/045; G06N 3/08; G06T 19/00
See application file for complete search history.

(56) References Cited

U.S. PATENT DOCUMENTS

| | | | |
|---|---|---|---|
| 6,691,563 | B1 | 2/2004 | Trabelsi et al. |
| 2004/0031335 | A1 | 2/2004 | Fromme et al. |

(Continued)

FOREIGN PATENT DOCUMENTS

| | | |
|---|---|---|
| WO | 2021001796 A1 | 1/2021 |
| WO | 2022200909 A1 | 9/2022 |

OTHER PUBLICATIONS

Kavasidis et al, Brain2Image: Converting Brain Signals into Images, MM'17 (Year: 2017).*

(Continued)

*Primary Examiner* — Xiao Liu
(74) *Attorney, Agent, or Firm* — Kyle R Satterthwaite; Ryan W Dupuis; Ade & Company Inc.

(57) ABSTRACT

A system features a neural network trained on labeled data and configured to receive electromagnetic field measurement data from an object of interest as input to the neural network, and to reconstruct a three-dimensional (3D) distribution image of a physical property of the object of interest from the received electromagnetic field measurement data. The reconstruction is implemented without performing a forward solve during the reconstruction. The neural network has two branches, a first of which comprises a two-stage convolutional decoder, whose first stage transforms inputted scattered field data to a 3D distribution image of the physical property, and whose second stage has suc- (Continued)

cessive deconvolutional and upsampling layers. A second branch, arranged in parallel with the first, receives prior information, and respective outputs of the two branches are combined to achieve a reconstructed 3D volume of the physical property.

20 Claims, 5 Drawing Sheets

(56) References Cited

U.S. PATENT DOCUMENTS

| | | | |
|---|---|---|---|
| 2014/0218230 | A1 | 8/2014 | Ostadrahimi et al. |
| 2014/0354299 | A1 | 12/2014 | Rapoport |
| 2015/0168313 | A1 | 6/2015 | Jean |
| 2016/0033316 | A1 | 2/2016 | Honeck |
| 2017/0199134 | A1 | 7/2017 | LoVetri et al. |
| 2020/0072766 | A1 | 3/2020 | Reimer et al. |
| 2020/0337589 | A1 | 10/2020 | Schrattenecker et al. |

OTHER PUBLICATIONS

Lahivaara et al, Estimation of moisture content distribution in porous foam using microwave tomography with neural networks, arXiv:2009.05297v1 (Year: 2020).*

Bartley et al, Determining moisture content of wheat with an artificial neural network from microwave transmission measurements, IEEE Transactions on Instrumentation and Measurement, vol. 7, Issue 1, pp. 123-126 (Year: 1998).*

Han et al, Image-based 3D Object Reconstruction: State-of-the-Art and Trends in the Deep Learning Era, arXiv:1906.0654 (Year: 2019).*

European Patent Office, Search Report for related PCT Application No. PCT/IB2022/052391, dated Jun. 21, 2022, 17 pages.

Mohammad Asefi et al.: "Detection and continuous monitoring of localised high-moisture regions in a full-scale grain storage bin using electromagnetic imaging", Biosystems Engineering, vol. 163, 2017, pp. 37-49, ISSN 1537-5110, DOI: 10.1016/j.biosystemseng.2017.08.015.

Colin Gilmore et al: "Industrial scale electromagnetic grain bin monitoring", Computers and Electronics in Agriculture, vol. 136, 2017, pp. 210-220, ISSN 0168-1699, DOI: 10.1016/j.compag.2017.03.005.

Mohammad Asefi et al: "Grain bin monitoring via electromagnetic imaging", Computers and Electronics in Agriculture, vol. 119, 2015, pp. 133-141, ISSN 0168-1699, DOI: 10.1016/j.compag.2015.10.016.

Colin Gilmore et al: "Phaseless parametric inversion for system calibration and obtaining prior information," IEEE Access, vol. 7, pp. 128735-128745, 2019, INSS 2169-3536, DOI:10.1109/ACCESS.2019.2939725.

Joe LoVetri et al: "Innovations in electromagnetic imaging technology: The stored-grain-monitoring case," IEEE Antennas and Propagation Magazine, vol. 62, pp. 33-43, 2020, DOI: 10.1109/MAP.2020.3003206.

Keeley Edwards et al: "Stored Grain Inventory Management Using Neural-Network-Based Parametric Electromagnetic Inversion," IEEE Access, vol. 8, pp. 207182-207192, INSS: 2169-3536, DOI: 10.1109/ACCESS.2020.3038312.

Vahab Khoshdel et al: "Enhancement of multimodal microwave-ultrasound breast imaging using a deep-learning technique," Sensors, 2019, p. 4050 DOI: 10.3390/s19184050.

Vahab Khoshdel et al: "Full 3d microwave breast imaging using a deep-learning technique," Journal of Imaging, vol. 6, No. 8, p. 80, 2020, DOI: 10.3390/jimaging6080080.

Asefi Mohmmad et al: "Surface-Current Measurements as Data for Electromagnetic Imaging Within Metallic Enclosures", IEEE Transactions on Microwave Theory and Techniques, vol. 64, pp. 4039-4047, DOI: 10.1109/TMTT.2016.2605665.

Goodfellow, Ian, Yoshua Bengio, and Aaron Courville. Deep learning. MIT press, 2016.

Olaf Ronneberger et al: "U-net: Convolutional networks for biomedical image segmentation," CoRR, vol. abs/1505.04597, 2015. [Online].

Timo Lahivaara et al: "Estimation of moisture content distribution in porous foam using microwave tomography with neural networks", Cornell Univerity Library, 201, NY 14853, Sep. 11, 2020, XP081760362, DOI: 10.1109/TCI.2020.3022828.

Isaak Kavasidis et al: "Brain2Image: Converting Brain Signals into Images", Association for Computing Machinery, 2017, pp. 1809-1817, DOI: 10.1145/3123266.3127907.

Keeley Edwards et al: "A Machine Learning Workflow for Tumour Detection in Breasts Using 3D Microwave Imaging", Eletronics, vol. 10, p. 674, 2021, DOI: 10.3390/electronics10060674.

Li et al: "Deepnis: Deep neural network for nonlinear electromagnetic inverse scattering", IEEE Transactions on Antennas and Propagation, vol. 67, pp. 1819-1645, 2019.

Anonymous: "U-Net—Wikipedia", Mar. 5, 2021, pp. 1-3, XP055930080, Retrieved from the Internet: https://web.archive.org/web/20210305142013/https://en.wikipedia.org/wiki/U-Net [retrieved on Jun. 10, 2022].

Anonymous: "Ensemble averaging (machine learning)—Wikipedia", Feb. 20, 2020, pp. 1-3, XP055930108, Retrieved from the Internet: https://web.archive.org/web/20200220180211 /https://en.wikipedia.org/wiki/Ensemble averaging (machine learning) [retrieved on Jun. 10, 2022].

* cited by examiner

DEEP LEARNING FOR ELECTROMAGNETIC IMAGING OF STORED COMMODITIES

CROSS-REFERENCE TO RELATED APPLICATION

This application is a national phase entry under 35 U.S.C. § 371 of International Patent Application PCT/IB2022/052391. filed Mar. 16, 2022, designating the United States of America and published in English as International Patent Publication WO 2022/200931 A1 on September 29. 2022, which claims the benefit of U.S. Provisional Application No. 63/163,957, filed Mar. 22, 2021, which is hereby incorporated by reference in its entirety.

TECHNICAL FIELD

The present disclosure is generally related to electromagnetic imaging of containers.

BACKGROUND

The safe storage of grains is crucial to securing the world's food supply. Estimates of storage losses vary from 2 to 30%, depending on geographic location. Grains are usually stored in large containers, referred to as grain silos or grain bins, after harvest. Because of non-ideal storage conditions, spoilage and grain loss are inevitable. Consequently, continuous monitoring of the stored grain is an essential part of the post-harvest for the agricultural industry. Recently, electromagnetic inverse imaging (EMI) using radio frequency (RF) excitation has been proposed to monitor the moisture content of stored grain. The possibility of using electromagnetic waves to quantitatively image grains, and the motivation to do so, derives from the well-known fact that the dielectric properties of agricultural products vary with their attributes, such as the moisture content and the temperature, which in turn, indicates their physiological state.

Deep learning (DL) techniques, and in particular, convolutional neural networks (CNNs) have been applied to a very broad range of scientific and engineering problems. These include applications such as natural language processing, computer vision, and speech recognition. Convolutional neural networks have also been applied to medical imaging for segmentation, as well as detection and classification. For the case of medical imaging, DL techniques have been well investigated for many of the common modalities. CNNs are deep neural networks that were designed specifically for handling images as inputs. As is known, in CNNs, the parameterized local convolutions, at successively subsampled image-sizes, allow learning feature maps at multiple scales of pixel-organization. Historically, the most popular use of CNNs was as image classification neural networks. However, with the advent of encoder-decoder architectures, CNNs, and their variants, are increasingly being used for learning tensor-to-tensor (e.g. image-to-image, or vector-to-image) transformations, thereby enabling various data-driven, and learning based image reconstruction applications. In the case of electromagnetic inverse problems, researchers have been applying machine learning techniques to improve the performance of microwave imaging (MWI).

State-of-the-art, deep-learning-based MWI techniques generally fall into two categories. In the first category, CNNs have been combined with one of the traditional algorithms to enhance the performance of electromagnetic inversion. Using DL as a prior (or regularization) term, or using DL techniques as post-processing method for denoising and artifact removal, have been studied to indicate the performance of combination of deep learning with traditional methods. In the second category, DL techniques are employed to reconstruct the image from the measurement data. This second category is still quite preliminary but promising results have been obtained. While promising studies have been done in using DL techniques to reconstruct the image directly from the measurement data for other imaging modalities like MRI and Ultrasound, there is a need to investigate how deep learning can be utilized to perform the inversion in microwave imaging. Most recently, Li et al. ("Deepnis: Deep neural network for nonlinear electromagnetic inverse scattering", L. Li, L. G. Wang, F. L. Teixeira, C. Liu, A. Nehorai, T. J. Cui, *IEEE Transactions on Antennas and Propagation,* vol. 67, no. 3, pp. 1819-1645, March 2019) tried to utilize a deep neural network for nonlinear electromagnetic inverse scattering. They have shown that the proposed deep neural network can learn a general model approximating the underlying EM inverse scattering system. However, the targets were simple homogeneous targets with low contrast, and only limited to two-dimensional (2D) inverse problems. In real-world imaging problems, the electromagnetic fields scatter, and propagate through three-dimensional (3D) objects. However, researchers usually attempt to simplify this 3D problem to a 2D model to reduce the time of image reconstruction and decrease the computational complexity. Studies have shown that using a 2D model can increase the level of artifacts in reconstructed images. In addition, when the object of interest is small, there is a chance that it places between two consecutive imaging slices; then, the reconstruction algorithm may not discover the target. Therefore, having a viable 3D imaging technique is important for having an appropriate and practically useful reconstruction technique.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
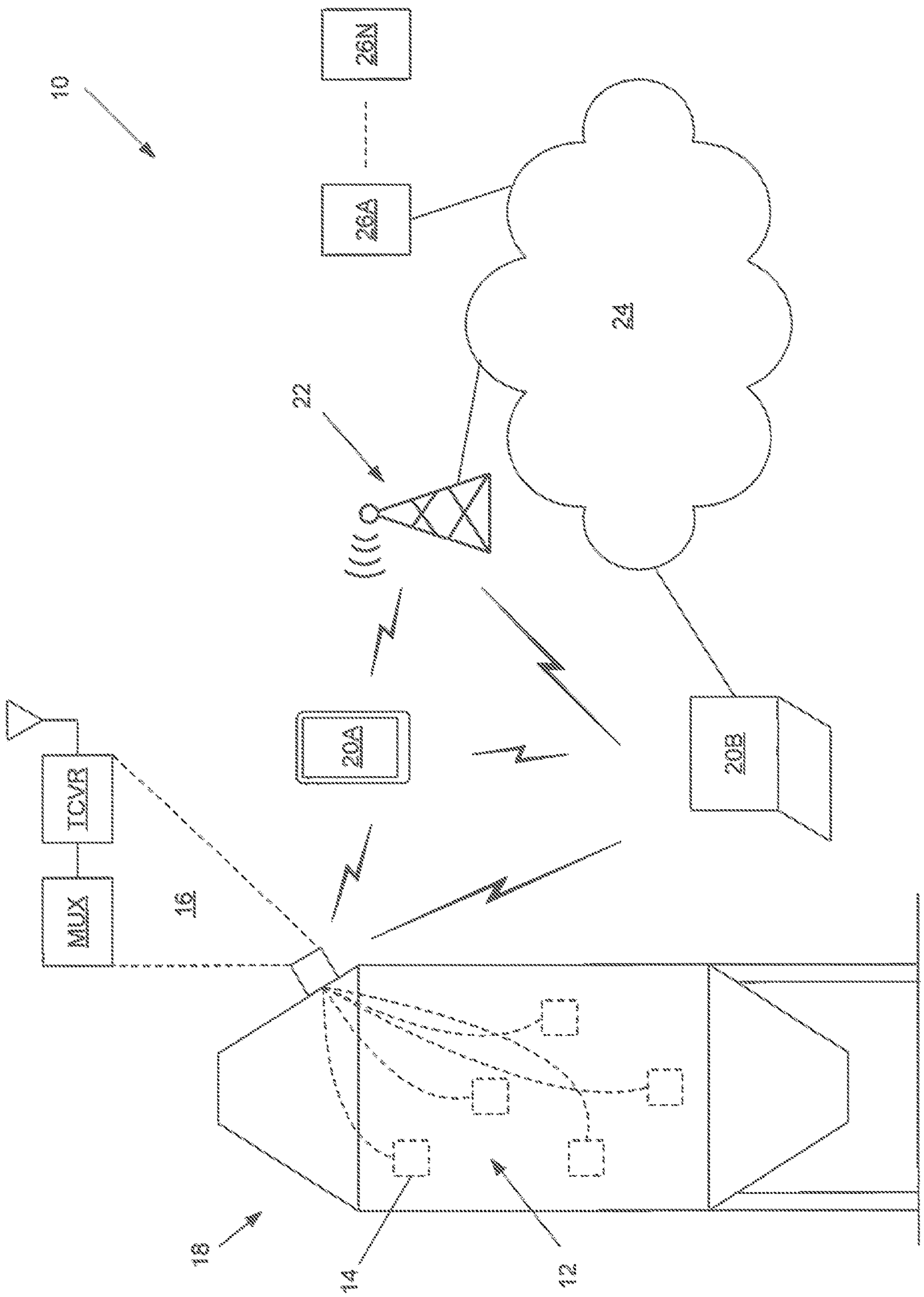
FIG. 1 is a schematic diagram that illustrates an example environment in which an embodiment of a deep learning system may be implemented.

In one embodiment, a system, comprising: a neural network, configured to: receive electromagnetic field measurement data from an object of interest as input to the neural network, the neural network trained on labeled data; and reconstruct a three-dimensional (3D) distribution image of a physical property of the object of interest from the received electromagnetic field measurement data, the reconstruction implemented without performing a forward solve during the reconstruction.

DETAILED DESCRIPTION

Certain embodiments of a deep learning system and method are disclosed that are used to solve electromagnetic inverse scattering problems for grain storage applications. In one embodiment, a deep learning system comprises a convolutional neural network that is trained with data from thousands of forward solves from many possible combinations of features, including grain heights, cone angles, and moisture distributions. Once trained, the neural network may determine a grain distribution for grain bins of similar structures and even for different cases without performing any iterative steps of a forward solve for new input data. That is, when applied after training, the neural network produces a three-dimensional (3D) image reconstruction for a given physical property (e.g., moisture distribution) of the grain in a matter of seconds, without the need for further forward solves. In some embodiments, a deep learning system directly reconstructs the 3D images of the physical property from the acquired electromagnetic field measurement data. For instance, in the case of grain monitoring and for a physical property of moisture content, certain embodiments of a deep learning system learn a reconstruction mapping from sensor-domain data (e.g., complex valued data array of transmitter-receiver measurements) to a 3D image of the moisture content, which avoids the need for explicitly modelling of a nonlinear transformation from acquired raw data to the 3D image of the moisture content and hence reduces modeling error that tends to plague traditional inverse scattering approaches.

Digressing briefly, in addition to some of the shortcomings to deep learning approaches described above, past approaches to solve the associated quantitative inverse scattering problem, which is ill-posed and nonlinear, have their own set of challenges. Obtaining highly accurate reconstructions of the complex-valued permittivity generally requires the use of computationally expensive iterative techniques, such as those found in contrast source inversion (CSI) techniques (e.g., Finite-Element (FEM) forward model CSI). This is especially true when trying to image highly inhomogeneous scatterers with high contrast values. Despite the advances made during the last twenty years, images containing reconstruction artifacts still remain an issue, and for biomedical imaging the resolution is still much lower when compared to other available modalities. For industrial applications, such as the monitoring of stored grain, the resolution may not be as much an issue, but the accuracy of the reconstructed complex valued permittivity is an issue, as is the high computational cost of traditional electromagnetic inversion techniques. In addition, for most cases, the permittivity, an electromagnetic property, is not the desired final outcome. In biomedical imaging, for example, the desired result may be an image of tissue-types, or a classification of cancerous versus noncancerous tissues (e.g., tumor or cancerous tissue detection). In the stored-grain application, ultimately, interest primarily lies in the moisture content of the grain as a function of position within the grain bin. Thus, there is an implied mapping from the complex valued permittivity to the physical property of interest. Such a mapping is difficult to incorporate directly into traditional inverse scattering algorithms. This subsequent mapping may also add to the inverse problem, now being defined as going from the electromagnetic field data to the property of interest. In some cases, an analytic expression for such a mapping may not be available. In contrast, certain embodiments of a deep learning system directly reconstructs 3D images of the physical property from the acquired electromagnetic field measurement data, thus providing a practical approach to solving the electromagnetic inverse problem while improving image quality and reducing modeling errors. Additionally, the deep learning system improves robustness to data noise. As for reconstruction time, the traditional CSI approach with its iterative approach may consume hours of processing time and require extensive computational resources, whereas after the initial training, the deep learning system may provide results almost instantly, thus improving upon the speed of processing and lowering the computational resource requirement for each case.

Having summarized certain features of a deep learning system of the present disclosure, reference will now be made in detail to the description of a deep learning system as illustrated in the drawings. While a deep learning system will be described in connection with these drawings, there is no intent to limit it to the embodiment or embodiments disclosed herein. For instance, in the description that follows, one focus is on grain bin monitoring. However, certain embodiments of a deep learning system may be used to determine other contents of a container, including one or any combination of other materials or solids, fluids, or gases, as long as such contents reflect electromagnetic waves. Additionally, certain embodiments of a deep learning system may be used in other industries, including the medical industry, among others. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

FIG. 1 is a schematic diagram that illustrates an example environment 10 in which an embodiment of deep learning system may be implemented. It should be appreciated by one having ordinary skill in the art in the context of the present disclosure that the environment 10 is one example among many, and that some embodiments of a deep learning system may be used in environments with fewer, greater, and/or different components than those depicted in FIG. 1. The environment 10 comprises a plurality of devices that enable communication of information throughout one or more networks. The depicted environment 10 comprises an antenna array 12 comprising a plurality of antenna probes 14 and an antenna acquisition system 16 that is used to monitor contents within a container 18 and uplink with other devices to communicate and/or receive information. The container 18 is depicted as one type of grain storage bin (or simply, grain bin), though it should be appreciated that containers of other geometries, for the same (e.g., grain) or other contents, with a different arrangement (side ports, etc.) and/or quantity of inlet and outlet ports, may be used in some embodiments. As is known, electromagnetic imaging uses active transmitters and receivers of electromagnetic radiation to obtain quantitative and qualitative images of the complex dielectric profile of an object of interest (e.g., here, the contents or grain).

As shown in FIG. 1, multiple antenna probes 14 of the antenna array 12 are mounted along the interior of the container 18 in a manner that surrounds the contents to effectively collect the scattered signal. For instance, each transmitting antenna probe is polarized to excite/collect the signals scattered by the contents. That is, each antenna probe 14 illuminates the contents while the receiving antennas probes collect the signals scattered by the contents. The antenna probes 14 are connected (via cabling, such as coaxial cabling) to a radio frequency (RF) switch matrix or RF multiplexor (MUX) of the antenna acquisition system 16, the switch/mux switching between the transmitter/receiver pairs. That is, the RF switch/mux enables each antenna probe 14 to either deliver RF energy to the container 18 or collect the RF energy from the other antenna probes 14. The switch/mux is followed by an electromagnetic transceiver (TCVR) system of the antenna acquisition system 16 (e.g., a vector network analyzer or VNA). The electromagnetic transceiver system generates the RF wave for illumination of the contents of the container 18 as well as receives the measured fields by the antenna probes 14 of the antenna array 12. As the arrangement and operations of the antenna array 12 and antenna acquisition system 16 are known, further description is omitted here for brevity. Additional information may be found in the publications "Industrial scale electromagnetic grain bin monitoring", *Computers and Electronics in Agriculture,* 136, 210-220, Gilmore, C., Asefi, M., Paliwal, J., & LoVetri, J., (2017), "Surface-current measurements as data for electromagnetic imaging within metallic enclosures", *IEEE Transactions on Microwave Theory and Techniques,* 64, 4039, Asefi, M., Faucher, G., & LoVetri, J. (2016), and "A 3-d dual-polarized near-field microwave imaging system", *IEEE Trans. Microw. Theory Tech.,* Asefi, M., OstadRahimi, M., Zakaria, A., LoVetri, J. (2014).

Note that in some embodiments, the antenna acquisition system 16 may include additional circuitry, including a global navigation satellite systems (GNSS) device or triangulation-based devices, which may be used to provide location information to another device or devices within the environment 10 that remotely monitors the container 18 and associated data. The antenna acquisition system 16 may include suitable communication functionality to communicate with other devices of the environment.

The uncalibrated, raw data collected from the antenna acquisition system 16 is communicated (e.g., via uplink functionality of the antenna acquisition system 16) to one or more devices of the environment 10, including devices 20A and/or 20B. Communication by the antenna acquisition system 16 may be achieved using near field communications (NFC) functionality, Blue-tooth functionality, 802.11-based technology, satellite technology, streaming technology, including LoRa, and/or broadband technology including 3G, 4G, 5G, etc., and/or via wired communications (e.g., hybrid-fiber coaxial, optical fiber, copper, Ethernet, etc.) using TCP/IP, UDP, HTTP, DSL, among others. The devices 20A and 20B communicate with each other and/or with other devices of the environment 10 via a wireless/cellular network 22 and/or wide area network (WAN) 24, including the Internet. The wide area network 24 may include additional networks, including an Internet of Things (IoT) network, among others. Connected to the wide area network 24 is a computing system comprising one or more servers 26 (e.g., 26A, 26N).

The devices 20 may be embodied as a smartphone, mobile phone, cellular phone, pager, stand-alone image capture device (e.g., camera), laptop, tablet, personal computer, workstation, among other handheld, portable, or other computing/communication devices, including communication devices having wireless communication capability, including telephony functionality. In the depicted embodiment of FIG. 1, the device 20A is illustrated as a smartphone and the device 20B is illustrated as a laptop for convenience in illustration and description, though it should be appreciated that the devices 20 may take the form of other types of devices as explained above.

The devices 20 provide (e.g., relay) the (uncalibrated, raw) data sent by the antenna acquisition system 16 to one or more servers 26 via one or more networks. The wireless/cellular network 22 may include the necessary infrastructure to enable wireless and/or cellular communications between the device 20 and the one or more servers 26. There are a number of different digital cellular technologies suitable for use in the wireless/cellular network 22, including: 3G, 4G, 5G, GSM, GPRS, CDMAOne, CDMA2000, Evolution-Data Optimized (EV-DO), EDGE, Universal Mobile Telecommunications System (UMTS), Digital Enhanced Cordless Telecommunications (DECT), Digital AMPS (IS-136/TDMA), and Integrated Digital Enhanced Network (iDEN), among others, as well as Wireless-Fidelity (Wi-Fi), 802.11, streaming, etc., for some example wireless technologies.

The wide area network 24 may comprise one or a plurality of networks that in whole or in part comprise the Internet. The devices 20 may access the one or more server 26 via the wireless/cellular network 22, as explained above, and/or the Internet 24, which may be further enabled through access to one or more networks including PSTN (Public Switched Telephone Networks), POTS, Integrated Services Digital Network (ISDN), Ethernet, Fiber, DSL/ADSL, Wi-Fi, among others. For wireless implementations, the wireless/cellular network 22 may use wireless fidelity (Wi-Fi) to receive data converted by the devices 20 to a radio format and process (e.g., format) for communication over the Internet 24. The wireless/cellular network 22 may comprise suitable equipment that includes a modem, router, switching circuits, etc.

The servers 26 are coupled to the wide area network 24, and in one embodiment may comprise one or more computing devices networked together, including an application server(s) and data storage. In one embodiment, the servers 26 may serve as a cloud computing environment (or other server network) configured to perform processing required to implement an embodiment of a deep learning system. When embodied as a cloud service or services, the server 26 may comprise an internal cloud, an external cloud, a private cloud, a public cloud (e.g., commercial cloud), or a hybrid cloud, which includes both on-premises and public cloud resources. For instance, a private cloud may be implemented using a variety of cloud systems including, for example, Eucalyptus Systems, VMWare vSphere®, or Microsoft® HyperV. A public cloud may include, for example, Amazon EC2®, Amazon Web Services®, Terremark®, Savvis®, or GoGrid®. Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs). The cloud architecture of the servers 26 may be embodied according to one of a plurality of different configurations. For instance, if configured according to MICROSOFT AZURE™, roles are provided, which are discrete scalable components built with managed code. Worker roles are for generalized development, and may perform background processing for a web role. Web roles provide a web server and listen for and respond to web requests via an HTTP (hypertext transfer protocol) or HTTPS (HTTP secure) endpoint. VM roles are instantiated according to tenant defined configurations (e.g., resources, guest operating system). Operating system and VM updates are managed by the cloud. A web role and a worker role run in a VM role, which is a virtual machine under the control of the tenant. Storage and SQL services are available to be used by the roles. As with other clouds, the hardware and software environment or platform, including scaling, load balancing, etc., are handled by the cloud.

In some embodiments, the servers 26 may be configured into multiple, logically-grouped servers (run on server devices), referred to as a server farm. The servers 26 may be geographically dispersed, administered as a single entity, or distributed among a plurality of server farms. The servers 26 within each farm may be heterogeneous. One or more of the servers 26 may operate according to one type of operating system platform (e.g., WINDOWS-based O.S., manufactured by Microsoft Corp. of Redmond, Wash.), while one or more of the other servers 26 may operate according to another type of operating system platform (e.g., UNIX or Linux). The group of servers 26 may be logically grouped as a farm that may be interconnected using a wide-area network connection or medium-area network (MAN) connection. The servers 26 may each be referred to as, and operate according to, a file server device, application server device, web server device, proxy server device, or gateway server device.

In one embodiment, one or more of the servers 26 may comprise a web server that provides a web site that can be used by users interested in the contents of the container 18 via browser software residing on a device (e.g., device 20). For instance, the web site may provide visualizations that reveal physical properties (e.g., moisture content) and/or geometric and/or other information about the container and/or contents (e.g., the volume geometry, such as cone angle, height of the grain along the container wall, etc.).

The functions of the servers 26 described above are for illustrative purpose only. The present disclosure is not intended to be limiting. For instance, functionality of the deep learning system may be implemented at a computing device that is local to the container 18 (e.g., edge computing), or in some embodiments, such functionality may be implemented at the devices 20. In some embodiments, functionality of the deep learning system may be implemented in different devices of the environment 10 operating according to a primary-secondary configuration or peer-to-peer configuration. In some embodiments, the antenna acquisition system 16 may bypass the devices 20 and communicate with the servers 26 via the wireless/cellular network 22 and/or the wide area network 24 using suitable processing and software residing in the antenna acquisition system 16.

Note that cooperation between the devices 20 (or in some embodiments, the antenna acquisition system 16) and the one or more servers 26 may be facilitated (or enabled) through the use of one or more application programming interfaces (APIs) that may define one or more parameters that are passed between a calling application and other software code such as an operating system, a library routine, and/or a function that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer employs to access functions supporting the API. In some implementations, an API call may report to an application the capabilities of a device running the application, including input capability, output capability, processing capability, power capability, and communications capability.

An embodiment of a deep learning system may include any one or a combination of the components (or subcomponents) of the environment 10. For instance, in one embodiment, the deep learning system may include a single computing device (e.g., one of the servers 26 or one of the devices 20) comprising all or in part a convolutional neural network, and in some embodiments, the deep learning system may comprise the antenna array 12, the antenna acquisition system 16, and one or more of the server 26 and/or devices 20 embodying the neural network. For purposes of illustration and convenience, implementation of an embodiment of a deep learning system is described in the following as being implemented in a computing device (e.g., comprising one or a plurality of GPUs or CPUs) that may be one of the servers 26, with the understanding that functionality may be implemented in other and/or additional devices.

In one example operation (and assuming a neural network that has been trained using labeled data (synthetic/numerical and optionally experimental field data)), a user (via the device 20) may request measurements of the contents of the container 18. This request is communicated to the antenna acquisition system 16. In some embodiments, the triggering of measurements may occur automatically based on a fixed time frame or based on certain conditions or based on detection of an authorized user device 20. In some embodiments, the request may trigger the communication of measurements that have already occurred. The antenna acquisition system 16 activates (e.g., excites) the antenna probes 14 of the antenna array 12, such that the acquisition system (via the transmission of signals and receipt of the scattered signals) collects a set of raw, uncalibrated electromagnetic data at a set of (a plurality of) discrete, sequential frequencies (e.g., 10-100 Mega-Hertz (MHZ), though not limited to this range of frequencies nor limited to collecting the frequencies in sequence). In one embodiment, the uncalibrated data comprises total-field, S-parameter measurements (which are used to generate both a calibration model or information and a prior model or information as described below). As is known, S-parameters are ratios of voltage levels (e.g., due to the decay between the sending and receiving signal). Though S-parameter measurements are described, in some embodiments, other mechanisms for describing voltages on a line may be used. For instance, power may be measured directly (without the need for phase measurements), or various transforms may be used to convert S-parameter data into other parameters, including transmission parameters, impedance, admittance, etc. Since the uncalibrated S-parameter measurement is corrupted by the switching matrix and/or varying lengths and/or other differences (e.g., manufacturing differences) in the cables connecting the antenna probes 14 to the antenna acquisition system 16, some embodiments of the deep learning system may use only magnitude (i.e., phaseless) data as input, which is relatively unperturbed by the measurement system. The antenna acquisition system 16 communicates (e.g., via a wired and/or wireless communications medium) the uncalibrated (S-parameter) data to the device 20, which in turn communicates the uncalibrated data to the server 26. At the server 26, data analytics are performed using a trained neural network as described further below.

Figure 2:
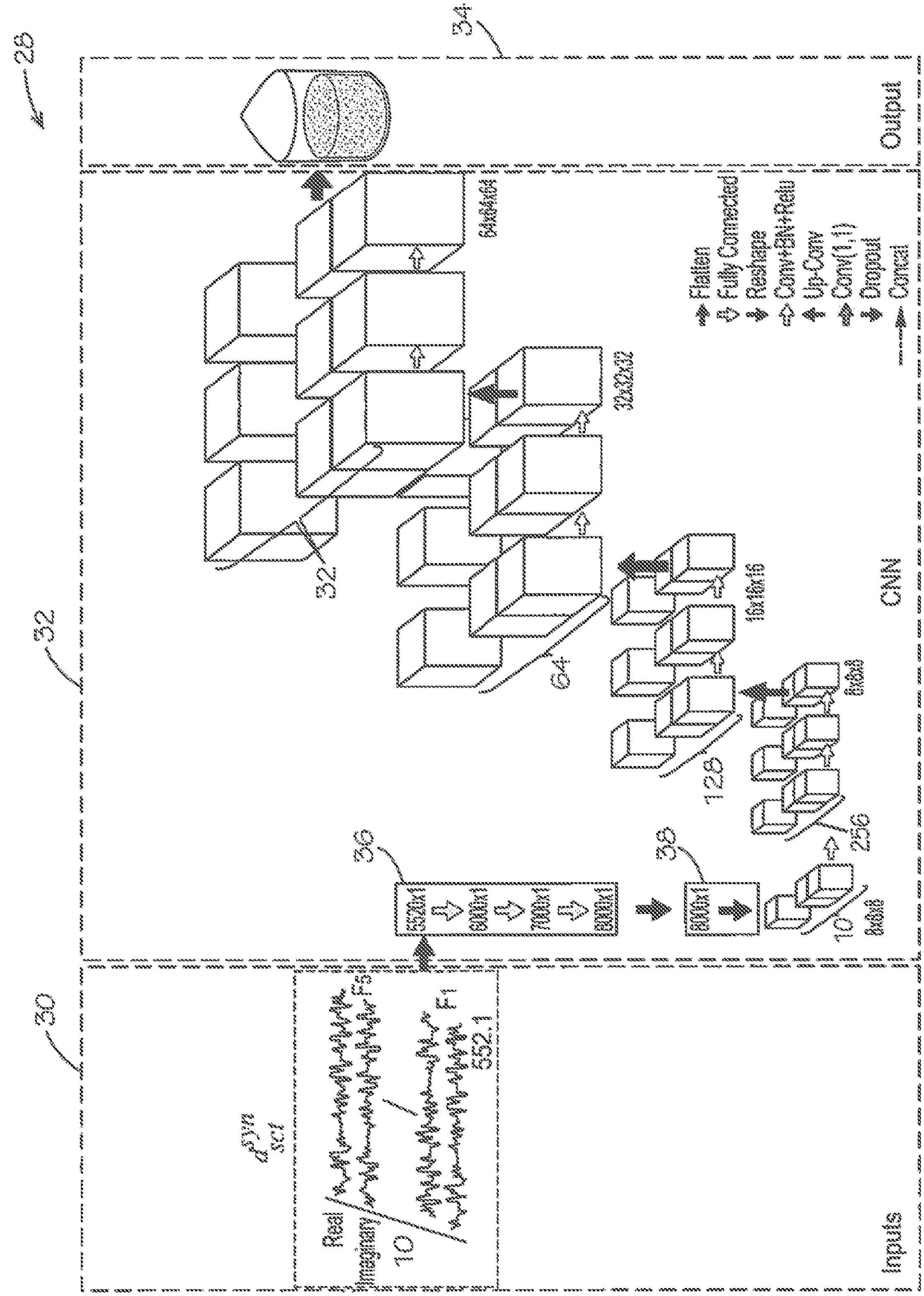
FIG. 2 is a schematic diagram that illustrates one embodiment of a deep learning system.
Figure 3:
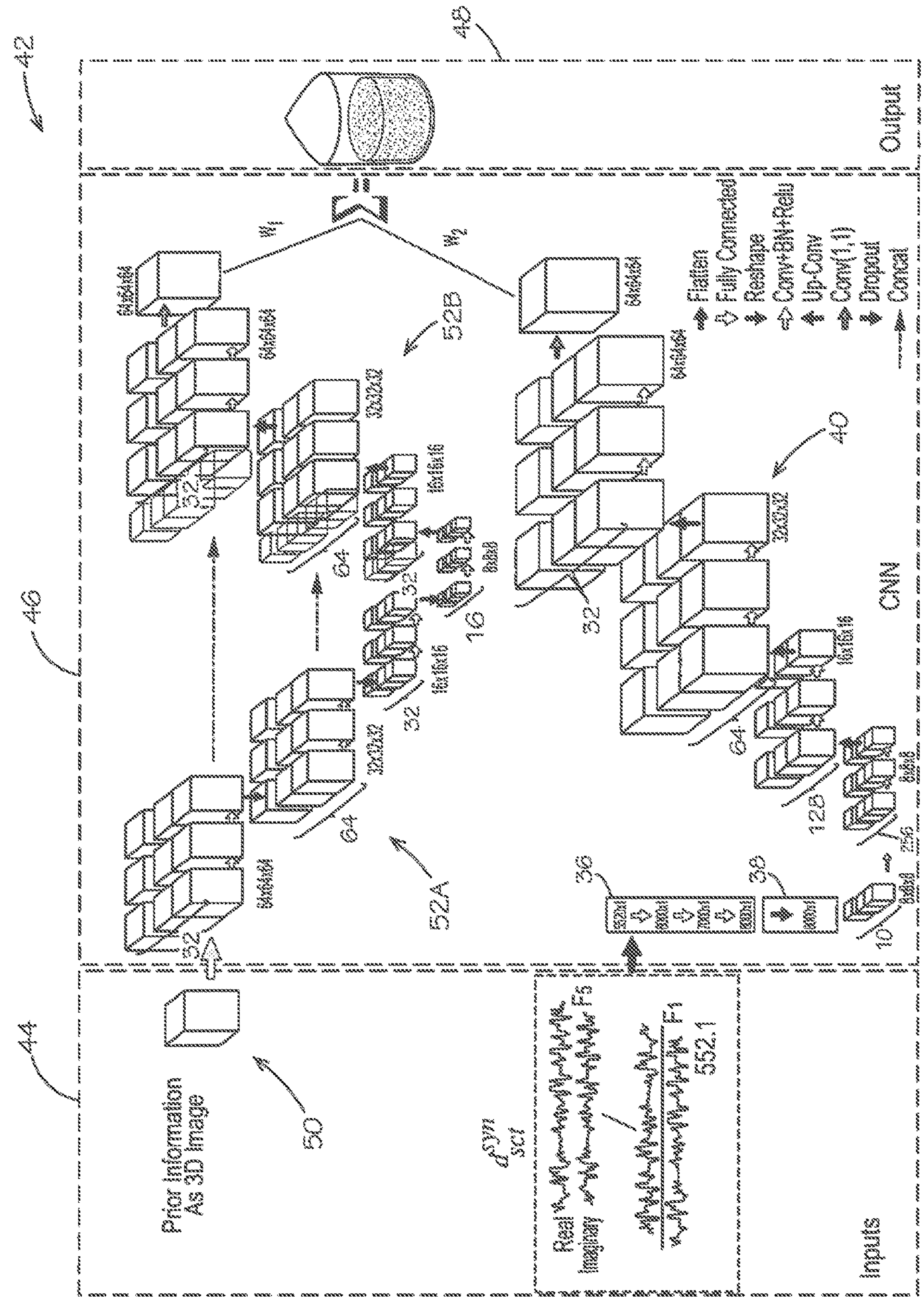
FIG. 3 is a schematic diagram that illustrates another embodiment of a deep learning system.

FIGS. 2 and 3 are schematic diagrams that illustrate embodiments of two deep learning architectures. Before fully describing these architectures, a brief recap of the systems these architectures replace, and improvements afforded by the deep learning approach, follows for context. In conventional inverse scattering techniques, an iterative optimization algorithm (e.g., FEM-CSI) is used as the main algorithm and electromagnetic field data is fed to that algorithm as the input. At each iteration, the algorithm does a forward solve for the optimized parameters (e.g., permittivity—a parameter that is related to the grain's moisture/temperature, etc.) at every location inside the grain bin. This process generates a set of fields, and calculates an error between this new data and the measured field data. This process is repeated (e.g., the algorithm changes the permittivity of all the elements within the bin at each iteration and calculates this error multiple times to find the parameters with the lowest error) until finally the algorithm finds the best sets of parameters that produce the lowest error between fields solved for the optimized parameters and the measured fields. This process is performed for every new measurement data set, and may take hours every time. In certain embodiments of a deep learning system (e.g., using a convolutional neural network), however, a neural network is trained with data from thousands (or more) of forward solves from many random possible combinations of grain heights, cone angles, moisture distributions, temperature, density, etc., with a result being a network that has processed many combinations of grain distributions inside a given bin. Accordingly, the trained neural network can determine one or more physical properties for a grain distribution for cases seen or unseen without performing any iterative steps for any new input data. So in this case, after the neural network is trained for a given grain bin specification, measured data can be inputted to the neural network any time and a result is obtained quickly (e.g., seconds), without any further need for forward solves.

Explaining further to highlight these differences, methods for solving the inverse scattering problems can broadly be categorized into objective-function based approaches and data-driven learning techniques. Traditional electromagnetic inverse scattering iterative methods, such as the CSI method described above, are classified as objective-function approaches, also known as model-based approaches. These methods attempt to solve for a desired unknown, say a property image Ip, by minimizing an inverse problem cost-function in terms of collected data d. For the above CSI formulation, the property image is Ip=x(r) or εr(r), where x(r) is a contrast function and εr(r) is complex-valued permittivity as a function of position. The general form of the inverse problem cost-function may then be written as Eqn. 1 below:

$$\underset{X}{\operatorname{argmin}} E_0\{F(Ip), d\} + R(x), \qquad \text{(Eqn. 1)}$$

where R(x) is a regularization function which depends only on the unknown to be reconstructed, x. In the CSI formulation, $E_0$ represents the data-error functional, $F^S$ (e.g., the norm of a difference of the measured scattered-field data, $d_t$), whereas R represents the Maxwellian regularizer, $F^D$ (e.g., calculated using an FEM model of the incident field and contrast and contrast sources), and the forward model is represented by F.

Unlike the objective cost-function approaches, which require an accurate forward model to solve the inverse problem, certain embodiments of learning approaches do not require that an explicit forward model be known beforehand. Rather, they utilize a large amount of data to implicitly learn a forward model while solving the inverse problem. To be able to train a network, labeled data is needed (e.g., which informs of almost everything about the data that is used for training, including the grain height, cone angle, moisture distribution, etc.). As would be expected, obtaining measured data from actual on-site storage bins is difficult and impractical for all bin dimensions, commodities, and combinations thereof. Accordingly, in some embodiments of a deep learning system, numerically generated data is generated as labeled data. For instance, if there are identical bins in the field with identical installations, numerical data generated for one bin may be used with the other bin as well (e.g., the CNN created for one bin can be used for all bins with the same physical properties (independent of the commodities getting stored)). Numerical or synthetic data may be the sole labeled data used for training in some embodiments. In some embodiments, a combination of numerically generated data and experimental data (e.g., measured data for different combinations of bin dimensions and content characteristics) may be used. Training is generally intended for a storage bin of a particular specification, and for different storage bins of different specifications (e.g., geometric specifications), the CNN may be trained specifically for those bin characteristics.

Learning approaches for inverse problems are classified as supervised learning because they employ a set of N ground truth images $$\{I_p^n\}$$

and their corresponding measurements $\{d^n\}$ in the training phase. Learning approaches learn a map $IM_\theta$, defined by a set of training parameters θ in a given space. In the training phase, the parameters θ are learned by solving a regression problem (Eqn. 2):

$$\underset{\theta}{\operatorname{argmin}} \sum_{n=1}^{N} EL\{IMe(x), d^n\} + R(\theta) \qquad \text{(Eqn. 2)}$$

which implicitly learns the inverse model $IM_\theta$, which maps whatever input is given to the inverse model to a property image. In the architectures described for certain embodiments of a deep learning system, the input x takes two forms. In the first case (FIG. 2), x comprises the acquired scattered field data, whereas in the second case (FIG. 3), x comprises the scattered field data in conjunction with some prior information regarding a background image that is assumed for an incident-field problem. In some embodiments, to avoid overfitting, R(θ) is defined as a regularization function, which depends on the training parameters. In imaging applications, the data-error functional, EL, may be chosen as a pixel-wise, mean squared error (MSE) between a desired image and the image that the neural network outputs, though other, similar-functioning mechanisms may be used in some embodiments. The mapping parameters θ are chosen, in one embodiment, by minimizing this functional over the training data-set. Once trained, the θ parameters become fixed and $IM_\theta$ represents the inverse model. Importantly, no forward model is required. Then in the testing phase, the trained $IM_\theta$ quickly generates a prediction $IM_\theta(x)$ given new input data.

The objective function approach requires that an optimization problem be solved with each new data set and this is typically quite computationally expensive. On the other hand, the learning approach of certain embodiments of a deep learning system shifts the computational load to the training phase, which is performed only once. When new data is obtained, the learning approach efficiently produces a guess corresponding to that new data. In addition, obtaining an accurate forward model is crucial for objective function approaches, and this can often be quite difficult for some applications like grain monitoring, where the physical property of interest is the moisture content of the stored grain. A forward model which produces predicted scattered-field data, given the inhomogeneous moisture content of an unknown amount of grain stored in a grain-bin, is quite difficult in its own right. For example, even the mapping from complex-valued permittivity to moisture content is quite difficult to obtain. In comparison, the learning approach of certain embodiments of a deep learning system may be implemented to directly reconstruct any physical property desired assuming a sufficient amount of training data.

Referring specifically to FIG. 2, shown is a schematic diagram of an embodiment of a deep learning system comprising a first neural network architecture 28 (hereinafter, referred to also as architecture1) configured to perform electromagnetic (e.g., microwave) imaging inversion. It should be appreciated by one having ordinary skill in the art that some of the values depicted in FIGS. 2-3 are for illustration, and that some embodiments may use additional, fewer, and/or different values. Architecture1 28 comprises an input block 30, a convolutional neural network (CNN) block 32, and an output block 34. The input block 30 is configured to accept, as input, real and imaginary parts of scattered field data at different frequencies, and produce, as an output, 3D images of the desired physical property (e.g., moisture content). For instance, in the example depicted in FIG. 2, the input block 30 receives normalized, real and imaginary parts of scattered field data for five (5) different frequencies (F), though additional or fewer amounts of frequency samples may be used in some embodiments. The horizontal arrow symbol between the input block 30 and the CNN block 32 signify a flattening operation (e.g., flattened for each of the $n_f$ frequencies).

The CNN block 32, as expressed above, comprises a convolutional decoder that consists of two main stages. The first stage consists of a stack of four fully connected layers 36, though in some embodiments, other quantities of layers may be used. The vertical arrow symbols between each of the layers 36 signifies that the layers are fully connected. The CNN block 32 further comprises a reshaping of the output of the fourth layer into a 3D image, as denoted by reshaping block 38 (with the vertical arrow within the block 38 signifying the reshaping). In effect, the first stage serves at least one purpose of transforming the input domain from scattered field data to a 3D moisture distribution image. In some embodiments, dropout layers (signified by the vertical arrow located between the layers 36 and the reshaping block 38) are used to prevent overfitting after each fully connected layer. The second stage comprises successive deconvolutional and upsampling layers 40 to produce the reconstructed 3D volume of moisture content of output block 34. Batch normalization has been used after each convolutional layer to accelerate convergence in the training phase. Each horizontal arrow located in and between the layers 40 signifies the operations of convolution, batch normalization, and an activation function (e.g., rectifier or also referred to as a ramp function), and each vertical arrow located between layers signifies upconversion operations as understood in the field of convolutional neural networks. In effect, the CNN block 32 is trained to output the corresponding true 3D volume of moisture content.

Referring now to FIG. 3, shown is a schematic diagram of another embodiment of a deep learning system comprising a second neural network architecture 42 (hereinafter, referred to also as architecture2) configured to perform electromagnetic (e.g., microwave) inverse imaging. Architecture2 42 comprises an input block 44, CNN block 46, and output block 48. As evident from a comparison of FIGS. 2-3, architecture2 42 includes at least the elements of architecture1 28, and hence description of the same is omitted here for brevity and clarity of description except as noted otherwise below. Additional features of architecture2 42 include an image of prior information 50 as part of the input block 44 (and as input to the CNN block 46). For grain applications, the image of prior information 50 comprises a background moisture image of the stored grain, and represents the assumed background for an incident field. The prior information 50 provides a more accurate and comprehensive description of the contents within the container (e.g., how the grain is distributed). The prior information 50 may include such information as the geometry of the grain bin, whether there is a hot spot(s) (pocket of moisture) or otherwise a region(s) of concern in this grain, whether the grain is heterogeneous, the density of the packed grain, etc. That simplified prior information 50 goes into the CNN block 46 in addition to the scattered field data. In contrast, without the prior information 50, such as in architecture1 28, the CNN block 32 needs to figure out much more than when utilizing the prior information 50, such as the height, cone angle, moisture of the grain, etc. Benefits to having the prior information 50 include less computational time during training, and overall improvement in 3D imaging performance.

Referring to the CNN block 46, as explained above, the CNN block 46 comprises a first branch comprising the four fully connected layers 36, the reshaping block 38, and the successive deconvolutional and upsampling layers 40 as explained above in conjunction with architecture1 28 of FIG. 2. In addition, the CNN block 46 comprises a second branch that receives the prior information 50 from the input block 44. The CNN block 46 comprises a multi-branch deep convolutional fusion architecture consisting of two parallel branches: the first branch comprises architecture1 28 as described above and takes in the scattered field data as input, and the second branch consists, in one embodiment, of a 3D U-Net 52 (e.g., 52A, 52B).

The 3D U-Net 52 comprises successive convolutional and downsampling layers 52A, followed by successive deconvolutional and upsampling layers 52B, where the quantity of layers may different in some embodiments. The horizontal arrow symbols within each of the layers 52A, 52B signify the operations of convolution, batch normalization, and an activation function, the downward arrow symbols between layers 52A signify dropouts as explained above, and the upward arrow symbols between layers 52B signify upconversion operations, as understood in the field of convolutional neural networks. The successive convolutional and downsampling layers 52A function as a feature extraction stage (e.g., encoder), while the successive deconvolutional and upsampling layers 52B function as a reconstruction network (e.g., decoder). Concatenative layers, represented by dashed horizontal arrows extending between layers 52A, 52B, have been added between the corresponding contractive and expansive layers to prevent the loss of information along the contractive path. In one embodiment, the outputs of the two branches 40, 52 are then fused together through, for instance, a parameterized linear combination.

One benefit of using a simple additive fusion approach (signified by the right-most summation symbol in the CNN block 46) is to force the individual branches to contribute as much as possible to the reconstruction task, by learning meaningful feature representations along the layers of each branch. In some embodiments, a more complicated fusion model may be used, though implementation of such an embodiment entails the risk of putting more burden on the fusion model itself and the risk it may learn idiosyncratic mappings, given its complexity, at the cost of not learning intrinsically useful representations along each of the input branches. Moreover, a simple fusion strategy has the added advantage of introducing interpretability to architecture2 42 in terms of how much scattered field data and prior information contribute to the final reconstruction.

The output block 48 comprises a relatively higher resolution 3D image (compared to the architecture 28 of FIG. 2) that provides more detail about the grain or commodity stored in that specific bin.

Note that certain intermediate neural network training functions, known to those skill in the art, such as the generation of validation and/or test sets, are omitted here for brevity.

Figure 4:
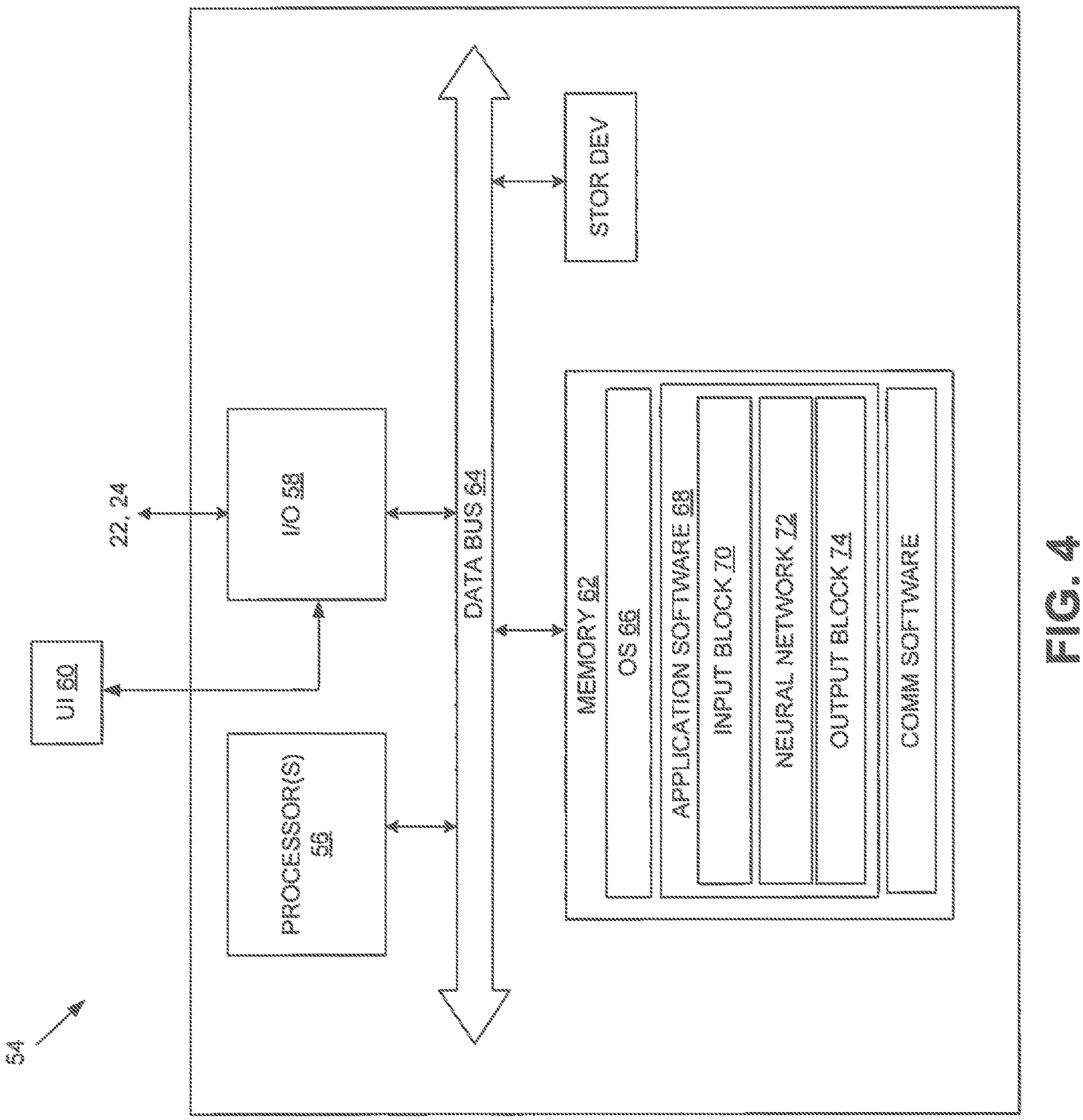
FIG. 4 is a block diagram that illustrates an example computing device of a deep learning system.

Having described an embodiment of a neural network-based parametric inversion system, attention is directed to FIG. 4, which illustrates an example computing device 54 used in one embodiment of the deep learning system. In one embodiment, the computing device 54 may be one or more of the servers 26 or one or more of the devices 20 (or the antenna acquisition system 16). Though described as implementing certain functionality of a deep learning method in a single computing device 54, in some embodiments, such functionality may be distributed among plural devices (e.g., using plural, distributed processors) that are co-located or geographically dispersed. In some embodiments, functionality of the computing device 54 may be implemented in another device, including a programmable logic controller, application-specific integrated circuit (ASIC), field-programmable gate array (FPGA), among other processing devices. It should be appreciated that certain well-known components of computers are omitted here to avoid obfuscating relevant features of computing device 54. In one embodiment, the computing device 54 comprises one or more processors (e.g., CPUs and/or GPUs), such as processor 56, input/output (I/O) interface(s) 58, a user interface 60, and memory 62, all coupled to one or more data busses, such as data bus 64. The memory 62 may include any one or a combination of volatile memory elements (e.g., random-access memory RAM, such as DRAM, and SRAM, etc.) and nonvolatile memory elements (e.g., ROM, hard drive, tape, CDROM, etc.). The memory 62 may store a native operating system, one or more native applications, emulation systems, or emulated applications for any of a variety of operating systems and/or emulated hardware platforms, emulated operating systems, etc. In the embodiment depicted in FIG. 4, the memory 62 comprises an operating system 66 and application software 68.

In one embodiment, the application software 68 comprises an input block module 70, neural network module 72, and output block module 74. The input block module 70 is configured to receive and format and process scattered field data and prior information, in addition to electromagnetic measurement data for a given field bin (e.g., for input to the trained neural network). Functionality of the input block module 70 is similar to that described for input block 30 (FIG. 2) and input block 44 (FIG. 3), and hence description of the same is omitted here for brevity. The neural network module 72 may be embodied as architecture1 28 (FIG. 2) or architecture2 (42 (FIG. 3), and hence a similar description applies for neural network module 72 and hence is omitted here for brevity. The trained neural network also receives inputted measurement data for a given storage bin in the field (e.g., over a wireless and/or wired network) and provides an output (e.g., 3D volume or distribution of moisture content and/or other physical property, including temperature, density, etc.) to the output block module 74. The output block module 74 is configured to render a visualization of the neural network output (e.g., via user interface 60 or a remote interface), with similar functionality to that described for output block 34 (FIG. 2) and output block 48 (FIG. 3), and hence the description of the same is omitted for brevity.

Memory 62 also comprises communication software that formats data according to the appropriate format to enable transmission or receipt of communications over the networks and/or wireless or wired transmission hardware (e.g., radio hardware). In general, the application software 68 performs the functionality described in association with the architectures depicted in FIGS. 2 and 3.

In some embodiments, one or more functionality of the application software 68 may be implemented in hardware. In some embodiments, one or more of the functionality of the application software 68 may be performed in more than one device. It should be appreciated by one having ordinary skill in the art that in some embodiments, additional or fewer software modules (e.g., combined functionality) may be employed in the memory 62 or additional memory. In some embodiments, a separate storage device may be coupled to the data bus 64, such as a persistent memory (e.g., optical, magnetic, and/or semiconductor memory and associated drives).

The processor 56 may be embodied as a custom-made or commercially available processor, a central processing unit (CPU), graphics processing unit (GPU), or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 54.

The I/O interfaces 58 provide one or more interfaces to the networks 22 and/or 24. In other words, the I/O interfaces 58 may comprise any number of interfaces for the input and output of signals (e.g., analog or digital data) for conveyance over one or more communication mediums. For instance, inputs may be received at the I/O interfaces 58 under management/control/formatting of the input block module 70 and the I/O interfaces 58 may output information under management/control/formatting of the output block module 74.

The user interface (UI) 60 may be a keyboard, mouse, microphone, touch-type display device, head-set, and/or other devices that enable visualization of the contents, container, and/or physical property or properties of interest, as described above. In some embodiments, the output may include other or additional forms, including audible or on the visual side, rendering via virtual reality or augmented reality based techniques.

Note that in some embodiments, the manner of connections among two or more components may be varied. Further, the computing device 54 may have additional software and/or hardware, or fewer software.

The application software 68 comprises executable code/instructions that, when executed by the processor 56, causes the processor 56 to implement the functionality shown and described in association with the deep learning system. As the functionality of the application software 68 has been described in the description corresponding to the aforementioned figures, further description here is omitted to avoid redundancy.

Execution of the application software 68 is implemented by the processor(s) 56 under the management and/or control of the operating system 66. In some embodiments, the operating system 66 may be omitted. In some embodiments, functionality of application software 68 may be distributed among plural computing devices (and hence, plural processors), or among plural cores of a single processor.

When certain embodiments of the computing device 54 are implemented at least in part with software (including firmware), as depicted in FIG. 4, it should be noted that the software can be stored on a variety of non-transitory computer-readable medium (including memory 62) for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing device 54 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
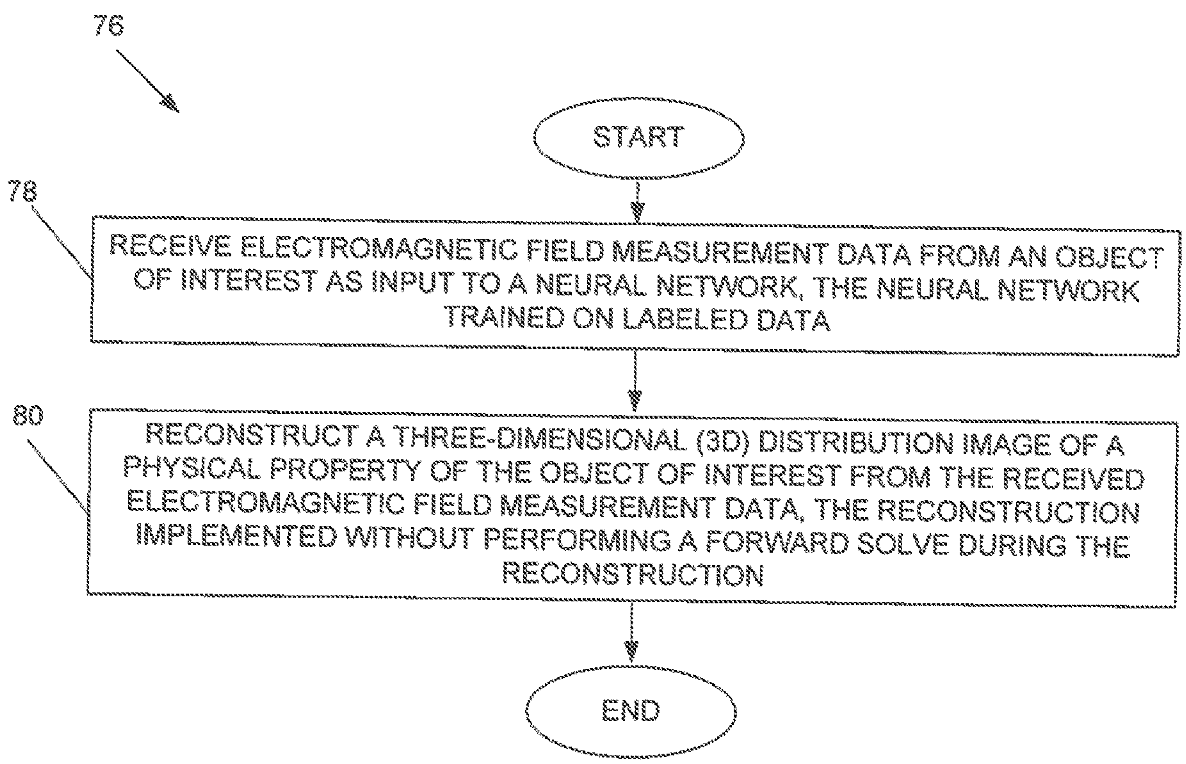
FIG. 5 is a flow diagram that illustrates an embodiment of an example deep learning method.

Having described certain embodiments of a deep learning system, it should be appreciated within the context of the present disclosure that one embodiment of a deep learning method, denoted as method 76, illustrated in FIG. 5, and implemented using one or more processors (e.g., of a computing device or plural computing devices), comprises receiving electromagnetic field measurement data from an object of interest as input to a neural network, the neural network trained on labeled data (78); and reconstructing a three-dimensional (3D) distribution image of a physical property of the object of interest from the received electromagnetic field measurement data, the reconstruction implemented without performing a forward solve during the reconstruction (80).

Any process descriptions or blocks in flow diagrams should be understood as representing logic (software and/or hardware) and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

Certain embodiments of a deep learning system and method uses deep machine learning techniques to create maps of the physical parameters of stored grain relevant to monitoring the health of the grain. The machine learning algorithms are trained from data acquired using electromagnetic and other types of sensors and produce the shape of the stored-grain as well as maps of such physical parameters as the grain's moisture-content, temperature, and density. The machine learning algorithms include convolutional neural networks in various forms, as well as fully connected neural networks.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the scope of the disclosure. All such modifications and variations are intended to be included herein within the scope of this disclosure and protected by the following claims.

The invention claimed is:

1. A system, comprising:

a neural network, configured to:

receive electromagnetic field measurement data from an object of interest as input to the neural network, the neural network trained on labeled data; and reconstruct a three-dimensional (3D) distribution image of a physical property of the object of interest from the received electromagnetic field measurement data, the reconstruction implemented without performing a forward solve during the reconstruction;

wherein the neural network comprises two branches, among which:

a first branch comprises a two-stage convolutional decoder, of which a first stage comprises a stack of fully connected layers configured to transform inputted scattered field data to a 3D distribution image of the physical property, and a second stage comprises successive deconvolutional and upsampling layers; and a second branch is arranged in parallel with the first branch and is configured to receive prior information; and respective outputs of the first and second branches are combined to achieve a reconstructed 3D volume of the physical property.

2. The system of claim 1, wherein the object of interest comprises contents within a container.

3. The system of claim 2, wherein the contents comprises grain, and the physical property comprises moisture content.

4. The system of claim 3, wherein the neural network is configured to implement the reconstruction without reconstructing an image of a complex valued permittivity of the grain.

5. The system of claim 1, wherein the labeled data comprises only synthetic data.

6. The system of claim 1, wherein the labeled data comprises synthetic data and measured data.

7. The system of claim 1, wherein the neural network is trained based on a plurality of forward solves.

8. The system of claim 1, wherein the second branch of the neural network comprises successive convolutional and downsampling layers corresponding to feature extraction followed by successive deconvolutional and upsampling layers corresponding to reconstruction.

9. The system of claim 1, wherein the second branch of the neural network comprises a 3D U-Net.

10. The system of claim 9, wherein the 3DU-Net comprises successive convolutional and downsampling layers corresponding to feature extraction followed by successive deconvolutional and upsampling layers corresponding to reconstruction.

11. A method, comprising:

receiving electromagnetic field measurement data from an object of interest as input to a neural network, the neural network trained on labeled data; and reconstructing a three-dimensional (3D) distribution image of a physical property of the object of interest from the received electromagnetic field measurement data, the reconstruction implemented without performing a forward solve during the reconstruction;

wherein the neural network comprises two branches, among which:

a first branch comprises a two-stage convolutional decoder, of which a first stage comprises a stack of fully connected layers configured to transform inputted scattered field data to a 3D distribution image of the physical property, and a second stage comprises successive deconvolutional and upsampling layers; and a second branch is arranged in parallel with the first branch and is configured to receive prior information; and respective outputs of the first and second branches are combined to achieve a reconstructed 3D volume of the physical property.

12. The method of claim 11, wherein the object of interest comprises contents within a container.

13. The method of claim 12, wherein the contents comprises grain, and the physical property comprises moisture content.

14. The method of claim 13, wherein the reconstructing is performed without reconstructing an image of a complex valued permittivity of the grain.

15. The method of claim 11, wherein the labeled data comprises only synthetic data.

16. The method of claim 11, wherein the labeled data comprises synthetic data and measured data.

17. The method of claim 11, wherein during training, performing a plurality of forward solves for a plurality of different combinations of content features.

18. The method of claim 11, wherein the second branch of the neural network comprises successive convolutional and downsampling layers corresponding to feature extraction followed by successive deconvolutional and upsampling layers corresponding to reconstruction.

19. The method of claim 11, wherein the second branch of the neural network comprises a 3D U-Net.

20. A non-transitory, computer readable medium comprising instructions, that when executed by one or more processors, causes the one or more processors to perform the method according to claim 11.

* * * * *